US010708676B2

(12) United States Patent
Chikamori et al.

(10) Patent No.: US 10,708,676 B2
(45) Date of Patent: Jul. 7, 2020

(54) OPTICAL TRANSMISSION LINE SWITCHING APPARATUS, OPTICAL TRANSMISSION SYSTEM, AND TRANSMISSION LINE SWITCHING METHOD

(71) Applicant: Mitsubishi Electric Corporation, Chiyoda-ku (JP)

(72) Inventors: Shun Chikamori, Tokyo (JP); Katsunori Imanishi, Tokyo (JP); Toshiyuki Tokura, Tokyo (JP); Kengo Takata, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/487,571

(22) PCT Filed: Apr. 10, 2017

(86) PCT No.: PCT/JP2017/014668
§ 371 (c)(1),
(2) Date: Aug. 21, 2019

(87) PCT Pub. No.: WO2018/189782
PCT Pub. Date: Oct. 18, 2018

(65) Prior Publication Data
US 2020/0059711 A1 Feb. 20, 2020

(51) Int. Cl.
*H04Q 11/00* (2006.01)
*H04B 10/038* (2013.01)
(Continued)

(52) U.S. Cl.
CPC ....... *H04Q 11/0005* (2013.01); *H04B 10/038* (2013.01); *H04B 10/032* (2013.01);
(Continued)

(58) Field of Classification Search
CPC ..... H04Q 11/0005; H04Q 2213/13521; H04Q 2011/0016; H04Q 11/00; H04B 10/038;
(Continued)

(56) References Cited

U.S. PATENT DOCUMENTS

| | | | |
|---|---|---|---|
| 3,701,851 A * | 10/1972 | Starrett | H01J 1/14 370/430 |
| 6,975,811 B1 * | 12/2005 | Kakizaki | H04Q 11/0062 398/2 |
| 7,039,313 B2 * | 5/2006 | Casanova | H04B 10/077 398/15 |
| 7,286,758 B2 * | 10/2007 | Shimada | H04B 1/745 398/15 |

(Continued)

FOREIGN PATENT DOCUMENTS

| | | |
|---|---|---|
| JP | 2003-69455 A | 3/2003 |
| WO | WO 2004/045114 A1 | 5/2004 |
| WO | WO 2015/049794 A1 | 4/2015 |

OTHER PUBLICATIONS

International Search Report dated Jun. 13, 2017 in PCT/JP2017/014668 filed on Apr. 10, 2017.

*Primary Examiner* — Abbas H Alagheband
(74) *Attorney, Agent, or Firm* — Oblon, McClelland, Maier & Neustadt, L.L.P.

(57) ABSTRACT

An optical transmission line switching apparatus relays main signal light input via a main transmission line including at least two transmission lines. When no failure occurs in the main transmission line, a control unit controls an optical switch and an optical switch so that the optical switch and the optical switch are connected to different transmission lines. When a failure occurs in one of the at least two transmission lines, the control unit controls the optical switch and the optical switch so that the optical switch and the optical switch are connected to a transmission line that does not have the failure. When recovery from the failure is completed, the control unit controls the optical switch and (Continued)

the optical switch so that the optical switch and the optical switch are connected to different transmission lines.

12 Claims, 9 Drawing Sheets

(51) Int. Cl.
H04B 10/079 (2013.01)
H04B 10/032 (2013.01)

(52) U.S. Cl.
CPC ...... *H04B 10/079* (2013.01); *H04B 10/07955* (2013.01); *H04Q 2011/0016* (2013.01); *H04Q 2213/13521* (2013.01)

(58) Field of Classification Search
CPC ...... H04B 10/08; H04B 10/17; H04B 10/032; H04B 17/00; H04J 14/02
USPC .......................................................... 398/5
See application file for complete search history.

(56) References Cited

U.S. PATENT DOCUMENTS

| | | | | |
|---|---|---|---|---|
| 7,356,258 | B1* | 4/2008 | Weverka | H04J 14/0227 398/59 |
| 7,466,478 | B2* | 12/2008 | Maeda | H04J 14/0291 359/341.4 |
| 8,244,123 | B2* | 8/2012 | Sugahara | H04B 10/032 398/1 |
| 9,628,173 | B2* | 4/2017 | Tokura | H04B 10/032 |
| 9,806,808 | B2* | 10/2017 | Bhatnagar | H04B 10/07957 |
| 2003/0194233 | A1* | 10/2003 | Casanova | H04B 10/077 398/2 |
| 2005/0123305 | A1* | 6/2005 | Kawasumi | H04B 10/07955 398/147 |
| 2010/0232782 | A1* | 9/2010 | Natori | H04J 14/0279 398/2 |
| 2016/0134360 | A1* | 5/2016 | Tokura | H04B 10/032 398/5 |
| 2017/0346549 | A1* | 11/2017 | Xie | H04Q 11/0066 |

* cited by examiner

OPTICAL TRANSMISSION LINE SWITCHING APPARATUS, OPTICAL TRANSMISSION SYSTEM, AND TRANSMISSION LINE SWITCHING METHOD

TECHNICAL FIELD

The present invention relates to an optical transmission line switching apparatus, an optical transmission system, and a transmission line switching method.

BACKGROUND ART

Generally, with growing demand for communication, a Wavelength Division Multiplexing (WDM) system exploiting the broadband characteristics of an optical amplifier is used. In recent years, furthermore, a transmission rate of 100 Gbps per wavelength in the WDM system is becoming mainstream, and the traffic per transmission line is thus increasing.

In an optical transmission system to transmit such large volumes of data, since a failure has a serious influence if it occurs, an improvement in reliability of the entire system is required. Therefore, an optical transmission system including an active line and a standby line is used to improve the reliability of the optical transmission system. In the optical transmission system including an active line and a standby line, when a failure occurs in the active line, it is possible to shorten the loss-of-signal time by switching a transmission line for signal light from the active line to the standby line.

During the line switching, no signal light is inputted for a while to an optical amplifier on the downstream side of a switch for line switching due to switching the transmission line for signal light from the active line to the standby line. Generally, since an optical amplifier in the optical transmission system performs constant output to amplify the optical power (input optical level) of the signal light to a predetermined power, an optical surge occurs in the optical amplifier due to variations in optical power before and after line switching. When an optical surge occurs, it may damage the optical amplifier and an optical receiver on the downstream side in the optical transmission system. Accordingly, a method for performing line switching while suppressing variations in optical power has been proposed (for example, patent references 1 and 2).

As the optical receiver in the optical transmission system, a digital coherent receiver using a digital coherent transmission technique as Digital Signal Processing (DSP) is mainstream. The digital coherent transmission technique is a technique for correcting, by using the optical receiver, waveform distortion that causes deterioration in signal quality such as Chromatic Dispersion (CD) and Polarization Mode Dispersion (PMD), in ultrahigh-speed signal transmission at a rate of 100 Gbps or more per wavelength.

Generally, since optical fibers having the same characteristics and distance are not always used for the active line and the standby line, a condition for signal processing in a digital coherent receiver is re-searched for in consideration of the difference in characteristic between the active line and the standby line, in switching from the active line to the standby line.

PRIOR ART REFERENCE

Patent Reference

Patent Reference 1: International Publication WO 2004/045114

Patent Reference 2: International Publication WO 2015/049794

SUMMARY OF THE INVENTION

Problem to be Solved by the Invention

However, in the conventional technique, since it takes a considerable time for the optical receiver of the optical transmission system to detect recovery from the failure in the transmission line, it is difficult to restart signal light transmission early.

It is an object of the present invention to prevent an optical surge from occurring and to restart signal light transmission early, when a transmission line in an optical transmission system is switched.

Means of Solving the Problem

An optical transmission line switching apparatus according to the present invention relays main signal light input via a main transmission line including at least two transmission lines. The optical transmission line switching apparatus includes a first demultiplexer to separate, into a plurality of signal light components, the main signal light input via a first transmission line of the at least two transmission lines, a second demultiplexer to separate, into the plurality of signal light components, the main signal light input via a second transmission line of the at least two transmission lines, a first optical transmission line switching device to perform connection switching to establish connection with one of the at least two transmission lines, a second optical transmission line switching device to perform connection switching to establish connection with one of the at least two transmission lines, and a controller to control the first optical transmission line switching device and the second optical transmission line switching device. When no failure occurs in the at least two transmission lines, the controller controls the first optical transmission line switching device and the second optical transmission line switching device so that the first optical transmission line switching device and the second optical transmission line switching device are connected to different transmission lines of the at least two transmission lines. When a failure occurs in one of the at least two transmission lines, the controller controls the first optical transmission line switching device and the second optical transmission line switching device so that the first optical transmission line switching device and the second optical transmission line switching device are connected to a transmission line that does not have the failure of the at least two transmission lines. When recovery from the failure is completed, the controller controls the first optical transmission line switching device and the second optical transmission line switching device so that the first optical transmission line switching device and the second optical transmission line switching device are connected to different transmission lines of the at least two transmission lines.

Effects of the Invention

According to the present invention, occurrence of an optical surge can be prevented and signal light transmission can be restarted early, when a transmission line in an optical transmission system is switched.

MODE FOR CARRYING OUT THE INVENTION

Embodiment 1

<Configuration of Optical Transmission System 100>

Figure 1:
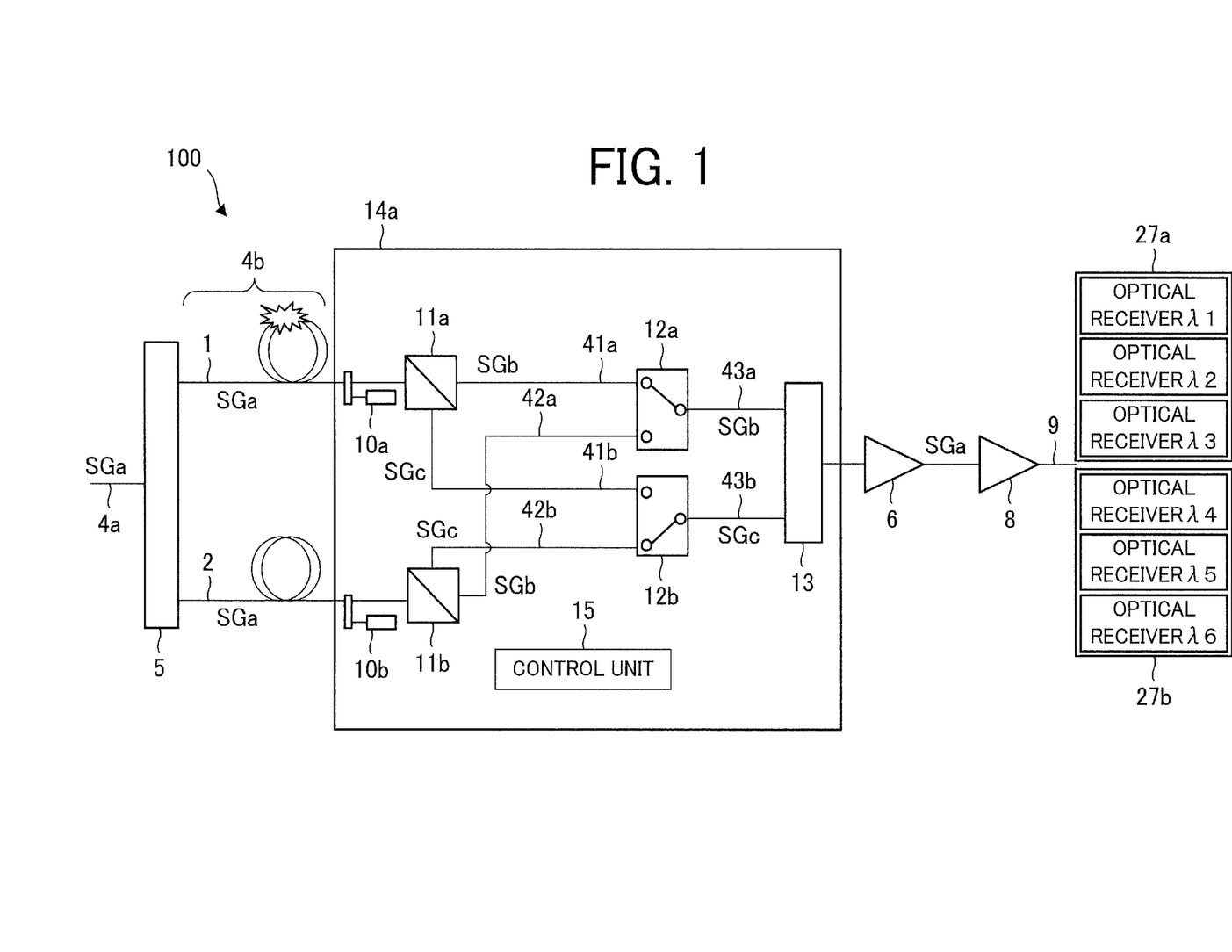
FIG. 1 is a diagram schematically illustrating a configuration of an optical transmission system according to Embodiment 1 of the present invention.

FIG. 1 is a diagram schematically illustrating a configuration of an optical transmission system 100 according to Embodiment 1 of the present invention.

The optical transmission system 100 includes main transmission lines 4a and 4b, an optical splitter 5, an optical transmission line switching apparatus 14a connected to the main transmission line 4b, optical amplifiers 6 and 8, a transmission line 9, and optical receivers 27a and 27b.

The optical transmission system 100 is used as, for example, a communication system to perform optical communication through submarine cables. In this case, the optical splitter 5, the main transmission lines 4a and 4b, and the optical transmission line switching apparatus 14a are provided in a land communication station, the optical amplifiers 6 and 8 are provided on the sea floor as relays, and the optical receivers 27a and 27b are provided in another land communication station (that is, a communication station on another continent). The optical splitter 5 and a transmitter to transmit signal light to the optical transmission line switching apparatus 14a are provided in an urban area distant from the optical transmission line switching apparatus 14a. However, the communication system to which the present invention is applied is not limited to a communication system to perform optical communication through submarine cables, and is also applicable to communication systems to perform optical communication with links between cities, and other types of optical wavelength multiplex communication.

The main transmission line 4a is connected to the main transmission line 4b including at least two transmission lines (in this Embodiment, transmission lines 1 and 2) via the optical splitter 5. The main transmission line 4a is branched into the transmission line 1 (first transmission line) and the transmission line 2 (second transmission line) by the optical splitter 5. In other words, in this Embodiment, the optical transmission system 100 is made redundant by the transmission lines 1 and 2. The transmission lines 1 and 2 are, for example, optical fibers.

The optical splitter 5 connects the main transmission line 4a to the transmission lines 1 and 2. In other words, the main transmission line 4a is branched into the transmission lines 1 and 2 by the optical splitter 5. With this arrangement, signal light SGa serving as main signal light input to the optical transmission system 100 is split into a signal light beam SGa to pass through the transmission line 1 and a signal light beam SGa to pass through the transmission line 2.

The optical amplifiers 6 and 8 amplify the signal light SGa output from the optical transmission line switching apparatus 14a to compensate for a loss occurring in a transmission line or a component in the optical transmission system 100.

The optical receivers 27a and 27b serve as, for example, digital coherent receivers. The optical receivers 27a and 27b receive the signal light SGa transferred from the optical transmission line switching apparatus 14a. More specifically, the optical receivers 27a and 27b receive the signal light SGa amplified by the optical amplifiers 6 and 8. Still more specifically, the optical receiver 27a receives a signal light component SGb having a wavelength $\lambda1$, $\lambda2$, or $\lambda3$ (the wavelengths $\lambda1$, $\lambda2$, and $\lambda3$ will be collectively referred to as "first wavelengths" hereinafter) of the signal light SGa, and the optical receiver 27b receives a signal light component SGc having a wavelength $\lambda4$, $\lambda5$, or $\lambda6$ (the wavelengths $\lambda4$, $\lambda5$, and $\lambda6$ will be collectively referred to as "second wavelengths" hereinafter) of the signal light SGa.

When the transmission line 1 recovers from a failure, the optical receiver 27a detects a temporary loss of signal of the signal light SGa from the optical transmission line switching apparatus 14a (more specifically, the signal light component SGb) and thus starts optimum adjustment to receive the signal light SGa (more specifically, the signal light component SGb) again. Similarly, when the transmission line 2 recovers from a failure, the optical receiver 27b detects a temporary loss of signal of the signal light SGa from the optical transmission line switching apparatus 14a (more specifically, the signal light component SGc) and thus starts optimum adjustment to receive the signal light SGa (more specifically, the signal light component SGc) again.

Figure 2:
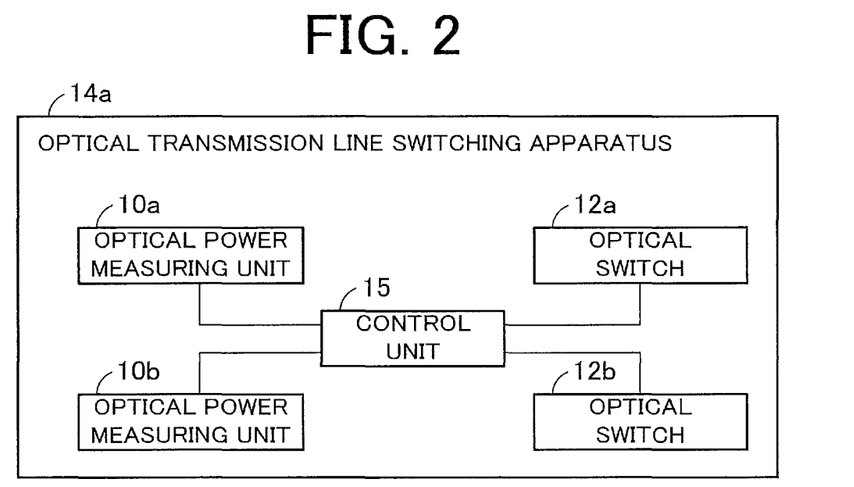
FIG. 2 is a block diagram schematically illustrating a configuration of a control system for an optical transmission line switching apparatus.

FIG. 2 is a block diagram schematically illustrating a configuration of a control system for the optical transmission line switching apparatus 14a.

As illustrated in FIGS. 1 and 2, the optical transmission line switching apparatus 14a includes an optical power measuring unit 10a (first optical power measuring unit), an optical power measuring unit 10b (second optical power measuring unit), an optical demultiplexer 11a (first demultiplexer), an optical demultiplexer 11b (second demultiplexer), an optical switch 12a as an optical transmission line switching unit (first optical transmission line switching unit), an optical switch 12b as an optical transmission line switching unit (second optical transmission line switching unit), a multiplexer 13, and a control unit 15.

The optical transmission line switching apparatus 14a relays the signal light SGa serving as main signal light input via the main transmission line 4b.

The optical power measuring unit 10a measures the optical power of the signal light beam SGa passing through the transmission line 1 of the at least two transmission lines (in this Embodiment, the transmission lines 1 and 2), and sends the measurement result to the control unit 15. The optical power measuring unit 10a is formed by, for example, an optical splitter and a photodiode. The optical power measuring unit 10a detects the optical power of the signal light beam SGa as an electrical signal.

The optical power measuring unit 10b measures the optical power of the signal light beam SGa passing through the transmission line 2 of the at least two transmission lines (in this Embodiment, the transmission lines 1 and 2), and sends the measurement result to the control unit 15. The optical power measuring unit 10b is formed by, for example, an optical splitter and a photodiode. The optical power measuring unit 10b detects the optical power of the signal light beam SGa as an electrical signal.

In this Embodiment, the optical power measuring unit 10a is provided between the optical splitter 5 and the optical demultiplexer 11a, and the optical power measuring unit 10b is provided between the optical splitter 5 and the optical demultiplexer 11b.

The optical demultiplexer 11a separates, into a plurality of signal light components (more specifically, signal light components SGb and SGc), the signal light beam SGa input via the transmission line 1 of the at least two transmission lines (that is, the transmission lines 1 and 2). More specifically, the optical demultiplexer 11a separates the signal light beam SGa passing through the transmission line 1 into signal light components (more specifically, signal light components SGb and SGc) having different wavelengths.

The optical demultiplexer 11b separates, into a plurality of signal light components (more specifically, signal light components SGb and SGc), the signal light beam SGa input via the transmission line 2 of the at least two transmission lines (that is, the transmission lines 1 and 2). More specifically, the optical demultiplexer 11b separates the signal light beam SGa passing through the transmission line 2 into signal light components (more specifically, signal light components SGb and SGc) having different wavelengths.

The optical demultiplexers 11a and 11b may be not only optical filters for separation into different wavelength ranges, but also interleavers to periodically separate a wavelength.

The optical switch 12a performs high-speed connection switching to establish connection with one of the at least two transmission lines (in this Embodiment, the transmission lines 1 and 2). In other words, the optical switch 12a connects a transmission line 43a between the optical switch 12a and the multiplexer 13 to one of a transmission line 41a between the optical demultiplexer 11a and the optical switch 12a and a transmission line 42a between the optical demultiplexer 11b and the optical switch 12a. In other words again, the optical switch 12a selects one of the signal light beam SGa (more specifically, the signal light component SGb output from the demultiplexer 11a) input to the optical transmission line switching apparatus 14a via the transmission line 1 and the signal light beam SGa (more specifically, the signal light component SGb output from the demultiplexer 11b) input to the optical transmission line switching apparatus 14a via the transmission line 2.

When the optical switch 12a connects the transmission line 43a to the transmission line 41a, the signal light component SGb separated by the optical demultiplexer 11a passes through the optical switch 12a and the transmission line 43a and is input to the multiplexer 13. When the optical switch 12a connects the transmission line 43a to the transmission line 42a, the signal light component SGb separated by the optical demultiplexer 11b passes through the optical switch 12a and the transmission line 43a and is input to the multiplexer 13.

The optical switch 12b performs high-speed connection switching to establish connection with one of the at least two transmission lines (in this Embodiment, the transmission lines 1 and 2). In other words, the optical switch 12b connects a transmission line 43b between the optical switch 12b and the multiplexer 13 to one of a transmission line 41b between the optical demultiplexer 11a and the optical switch 12b and a transmission line 42b between the optical demultiplexer 11b and the optical switch 12b. In other words again, the optical switch 12b selects one of the signal light beam SGa (more specifically, the signal light component SGc output from the demultiplexer 11a) input to the optical transmission line switching apparatus 14a via the transmission line 1 and the signal light beam SGa (more specifically, the signal light component SGc output from the demultiplexer 11b) input to the optical transmission line switching apparatus 14a via the transmission line 2.

When the optical switch 12b connects the transmission line 43b to the transmission line 41b, the signal light component SGc separated by the optical demultiplexer 11a passes through the optical switch 12b and the transmission line 43b and is input to the multiplexer 13. When the optical switch 12b connects the transmission line 43b to the transmission line 42b, the signal light component SGc separated by the optical demultiplexer 11b passes through the optical switch 12b and the transmission line 43b and is input to the multiplexer 13.

When a failure occurs in the transmission line 1 or 2, the optical switches 12a and 12b perform high-speed connection switching to generate an instantaneous loss-of-signal state in the optical transmission line switching apparatus 14a.

The multiplexer 13 multiplexes the signal light component SGb output from the optical switch 12a and the signal light component SGc output from the optical switch 12b. With this operation, the signal light components SGb and SGc are output from the optical transmission line switching apparatus 14a as the signal light SGa.

The control unit 15 controls the optical switches 12a and 12b. More specifically, the control unit 15 obtains, from the optical power measuring unit 10a, a measurement result of the optical power of the signal light beam SGa passing through the transmission line 1, and controls the optical switches 12a and 12b, based on the measurement result. Similarly, the control unit 15 obtains, from the optical power measuring unit 10b, a measurement result of the optical power of the signal light beam SGa passing through the transmission line 2, and controls the optical switches 12a and 12b, based on the measurement result.

When a failure occurs in one of the at least two transmission lines (in this Embodiment, the transmission lines 1 and 2), the control unit 15 controls the optical switches 12a and 12b so that the optical switches 12a and 12b are connected to a transmission line that does not have the failure of the at least two transmission lines.

When, for example, the measurement result of the optical power of the signal light beam SGa passing through the transmission line 1 is lower than a predetermined threshold, the control unit 15 detects that a failure occurs in the transmission line 1. When the control unit 15 detects that a failure occurs in the transmission line 1, the control unit 15 controls the optical switches 12a and 12b so that the optical switches 12a and 12b are connected to the transmission line (that is, the transmission line 2) other than the transmission line 1. After the occurrence of the failure in the transmission line 1, when the measurement result of the optical power of the signal light beam SGa passing through the transmission line 1 is equal to or higher than the predetermined threshold, the control unit 15 detects that the transmission line 1 recovers from the failure.

Similarly, when the measurement result of the optical power of the signal light beam SGa passing through the transmission line 2 is lower than a predetermined threshold, the control unit 15 detects that a failure occurs in the transmission line 2. When the control unit 15 detects that a failure occurs in the transmission line 2, the control unit 15 controls the optical switches 12a and 12b so that the optical switches 12a and 12b are connected to the transmission line (that is, the transmission line 1) other than the transmission line 2. After the occurrence of the failure in the transmission line 2, when the measurement result of the optical power of the signal light beam SGa passing through the transmission line 2 is equal to or higher than the predetermined threshold, the control unit 15 detects that the transmission line 2 recovers from the failure.

When recovery from the failure is completed, the control unit 15 controls the optical switches 12a and 12b so that the optical switches 12a and 12b are connected to different transmission lines of the at least two transmission lines.

Figure 3:
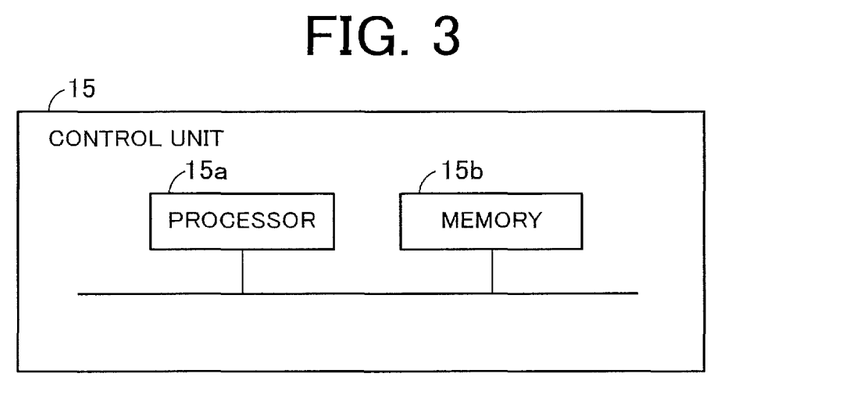
FIG. 3 is a block diagram illustrating an example of a specific hardware configuration of a control unit.

FIG. 3 is a block diagram illustrating an example of a specific hardware configuration of the control unit 15.

The control unit 15 includes, for example, a processor 15a such as a CPU (Central Processing Unit), and a memory 15b. In this case, the function of the control unit 15 can be implemented by the processor 15a and the memory 15b. For example, the processor 15a reads a program from the memory 15b and executes the function of the control unit 15. The program can be stored on a computer-readable recording medium. However, the specific hardware configuration of the control unit 15 is not limited to the configuration illustrated in FIG. 3.

The configuration of the optical transmission system 100 is not limited to that illustrated in FIG. 1. For example, the optical power measuring unit 10a may be provided between the optical demultiplexer 11a and the optical switch 12a, and the optical power measuring unit 10b may be provided between the optical demultiplexer 11b and the optical switch 12b. Furthermore, the optical transmission line switching apparatus 14a may include a WSS (Wavelength Selective Switch).

<Optical Communication in Optical Transmission System 100>

Next, an example of optical communication in the optical transmission system 100 will be described.

In a normal state in which no failure occurs in the transmission lines 1 and 2, the signal light SGa input to the optical transmission system 100 is split into two signal light beams SGa by the optical splitter 5.

The signal light beam SGa passing through the transmission line 1 is input to the optical demultiplexer 11a. The optical power of the signal light beam SGa passing through the transmission line 1 is detected by the optical power measuring unit 10a, and the detection result is sent to the control unit 15. The control unit 15 monitors whether the optical power of the signal light beam SGa passing through the transmission line 1 is normal.

Similarly, the signal light beam SGa passing through the transmission line 2 is input to the optical demultiplexer 11b. The optical power of the signal light beam SGa passing through the transmission line 2 is detected by the optical power measuring unit 10b, and the detection result is sent to the control unit 15. The control unit 15 monitors whether the optical power of the signal light beam SGa passing through the transmission line 2 is normal.

When no failure occurs in the main transmission line 4b, the control unit 15 controls the optical switches 12a and 12b so that the optical switches 12a and 12b are connected to different transmission lines of the transmission lines 1 and 2.

More specifically, in the normal state before a failure occurs, the optical switch 12a connects the transmission line 43a to the transmission line 41a. Therefore, the signal light component SGb separated by the optical demultiplexer 11a passes through the optical switch 12a and the transmission line 43a and is input to the multiplexer 13.

In the normal state before a failure occurs, the optical switch 12b connects the transmission line 43b to the transmission line 42b. Therefore, the signal light component SGc separated by the optical demultiplexer 11b passes through the optical switch 12b and the transmission line 43b and is input to the multiplexer 13.

The signal light components SGb and SGc input to the multiplexer 13 are multiplexed, and the signal light SGa is output from the optical transmission line switching apparatus 14a.

The signal light SGa output from the optical transmission line switching apparatus 14a is amplified by the optical amplifiers 6 and 8. The signal light component SGb of the amplified signal light SGa is input to the optical receiver 27a, and the signal light component SGc of the amplified signal light SGa is input to the optical receiver 27b.

Next, the operation of the optical transmission line switching apparatus 14a when a failure occurs in the transmission line 1 (a transmission line switching method for an optical transmission line switching apparatus) will be described.

Figure 4:
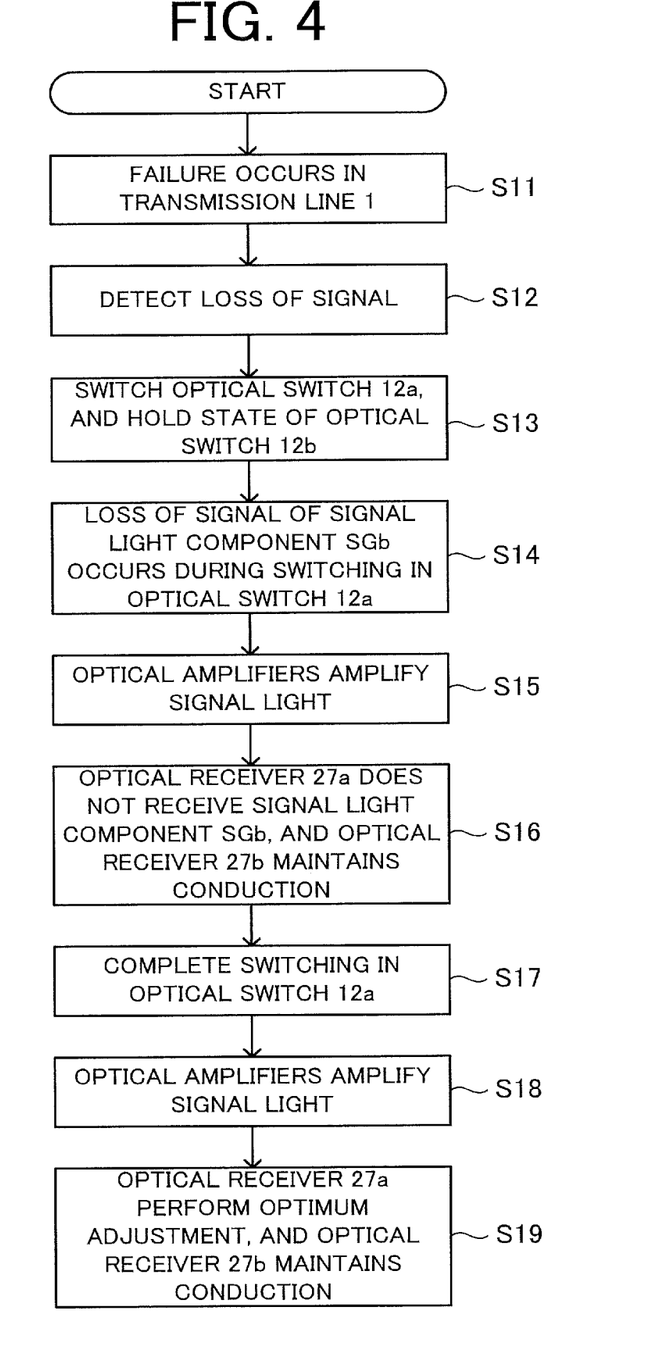
FIG. 4 is a flowchart illustrating an example of communication in the optical transmission system when a failure occurs in a transmission line.

FIG. 4 is a flowchart illustrating an example of communication in the optical transmission system 100 when a failure occurs in the transmission line 1.

When a failure occurs in the transmission line 1, light on the transmission line 1 disappears (step S11). An example of the failure in the transmission line 1 is breakage of the optical fiber serving as the transmission line 1.

In step S12, the control unit 15 confirms the light disappearance in the transmission line 1, and detects a loss of signal in the transmission line 1. More specifically, when the measurement result of the optical power of the signal light beam SGa passing through the transmission line 1 is lower than a predetermined threshold, the control unit 15 detects that the failure occurs in the transmission line 1.

In step S13, when the control unit 15 detects that the failure occurs in the transmission line 1, the control unit 15 controls the optical switches 12a and 12b so that the optical switches 12a and 12b are connected to a transmission line (in this Embodiment, the transmission line 2) other than the transmission line 1. More specifically, the control unit 15 controls the optical switch 12a to switch connection in the optical switch 12a, and controls the optical switch 12b to hold connection in the optical switch 12b. With this operation, the optical switch 12a starts processing (to be also referred to as switching processing hereinafter) to switch the transmission line to be connected to the transmission line 43a, from the transmission line 41a to the transmission line 42a.

While the optical switch 12a performs the switching processing, the signal light component SGb is not output from the optical switch 12a (step S14). In other words, while the optical switch 12a performs the switching processing, a loss of signal of the signal light component SGb occurs in the optical transmission line switching apparatus 14a.

While the optical switch 12a performs the switching processing, the signal light component SGc is output from the multiplexer 13. While the optical switch 12a performs the switching processing, the signal light component SGb is not output from the multiplexer 13. Therefore, while the optical switch 12a performs the switching processing, at least the signal light component SGc passes through the optical transmission line switching apparatus 14a, and a complete loss of signal in the optical transmission line switching apparatus 14a is thus prevented. The signal light (more specifically, the signal light component SGc) output from the optical transmission line switching apparatus 14a is amplified by the optical amplifiers 6 and 8 (step S15).

While the optical switch 12a performs the switching processing, the optical receiver 27a does not receive the signal light component SGb, and the optical receiver 27b continues to receive the signal light component SGc regardless of the occurrence of the failure (step S16).

When the switching processing is completed in the optical switch 12a, the optical switch 12a is connected to the transmission line 2 via the optical demultiplexer 11b. With this arrangement, the signal light component SGb is input from the transmission line 2 to the optical switch 12a via the optical demultiplexer 11b, and then output from the optical switch 12a. The multiplexer 13 multiplexes the signal light components SGb and SGc. With this operation, multiplexed signal light SGa (that is, signal light containing the signal light components SGb and SGc) is output from the optical transmission line switching apparatus 14a (step S17).

The signal light SGa output from the optical transmission line switching apparatus 14a is amplified by the optical amplifiers 6 and 8 (step S18).

Figure 5A:
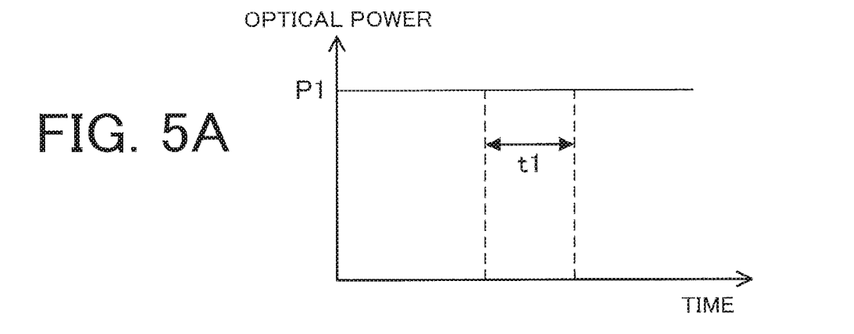
FIGS. 5A to 5C are diagrams each illustrating the optical power of signal light passing through another transmission line.
Figure 5B:
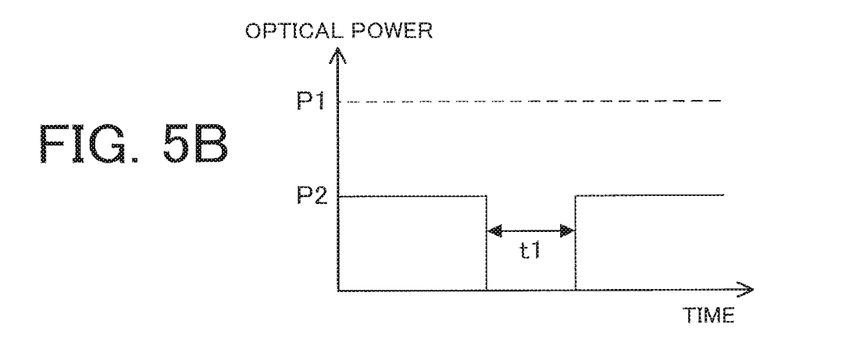
Figure 5C:
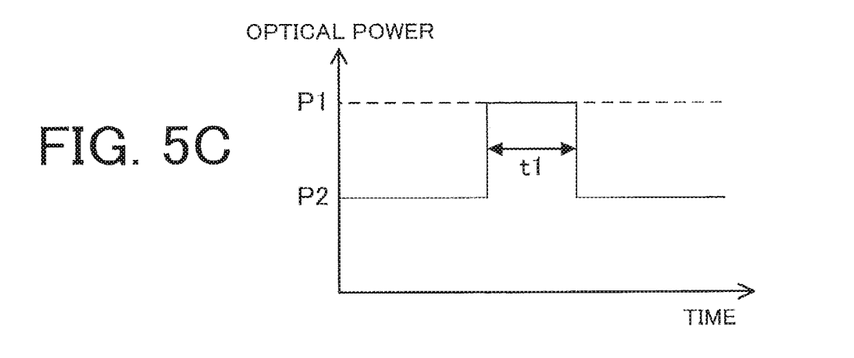

FIGS. 5A to 5C are diagrams illustrating the optical powers of the signal light SGa and the signal light components SGb and SGc, respectively, passing through the transmission line 9. More specifically, FIG. 5B illustrates the optical power of the signal light component SGb of the optical power of the signal light SGa passing through the transmission line 9, and FIG. 5C illustrates the optical power of the signal light component SGc of the optical power of the signal light SGa passing through the transmission line 9. A time t1 illustrated in each of FIGS. 5A to 5C represents the period in which the optical switch 12a performs the switching processing.

As illustrated in FIG. 5A, the signal light SGa passing through the transmission line 9 is controlled by the optical amplifiers 6 and 8 to be amplified to a predetermined optical power P1. As illustrated in FIG. 5B, during a period other than the time t1, the signal light component SGb passing through the transmission line 9 is controlled by the optical amplifiers 6 and 8 to be amplified to a predetermined optical power P2. During the time t1, the signal light component SGb is not amplified by the optical amplifiers 6 and 8. As illustrated in FIG. 5C, during the time t1, the signal light component SGc passing through the transmission line 9 is controlled by the optical amplifiers 6 and 8 to be amplified to the optical power P1. During a period other than the time t1, the signal light component SGc contained in the signal light SGa passing through the transmission line 9 is controlled by the optical amplifiers 6 and 8 to be amplified to the optical power P2.

In other words, as illustrated in FIG. 5A, while the optical switch 12a performs the switching processing (that is, during the time t1), the optical amplifiers 6 and 8 raise their amplification gain for the signal light component SGc output from the optical transmission line switching apparatus 14a, and after the elapse of the time t1, lower their amplification gain for the signal light component SGc contained in the signal light SGa output from the optical transmission line switching apparatus 14a. Accordingly, before and after the occurrence of the failure, the optical power of the signal light SGa passing through the transmission line 9 is maintained constant and consequently any optical surge can be prevented in recovering from the failure.

When the optical receiver 27a detects the signal light component SGb, the optical receiver 27a performs optimum adjustment (for example, setting of the amount of dispersion compensation) to establish connection to the new transmission line 2 (that is, a transmission line in which no failure occurs) (step S19). The optical receiver 27b continues to receive the signal light component SGc regardless of the occurrence of the failure.

Next, the operation of the optical transmission line switching apparatus 14a when the transmission line 1 recovers from the failure (a transmission line switching method for an optical transmission line switching apparatus) will be described.

Figure 6:
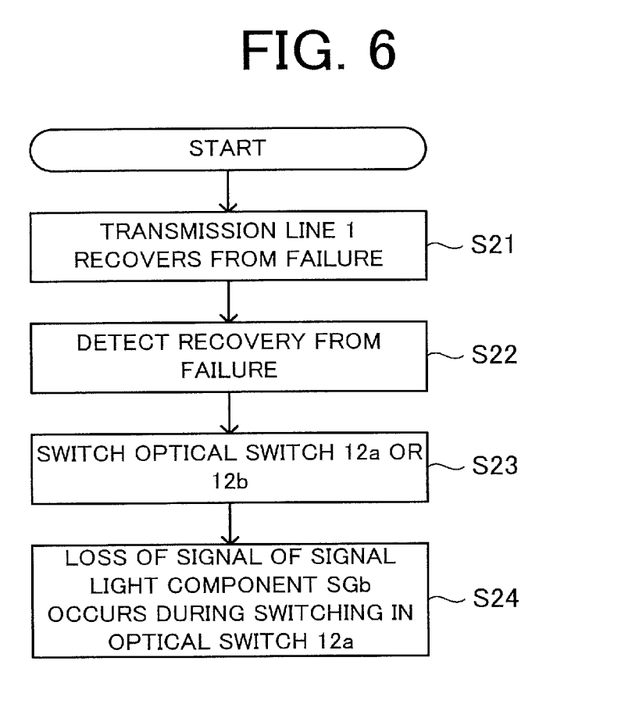
FIG. 6 is a flowchart illustrating an example of communication in the optical transmission system when the transmission line recovers from the failure.

FIG. 6 is a flowchart illustrating an example of communication in the optical transmission system 100 when the transmission line 1 recovers from the failure.

When the transmission line 1 recovers from the failure, transmission of the signal light beam SGa in the transmission line 1 recovers (step S21).

In step S22, the optical power measuring unit 10a detects the signal light beam SGa passing through the transmission line 1, and sends the detection result to the control unit 15. When the measurement result of the optical power of the signal light beam SGa passing through the transmission line 1 is equal to or higher than the predetermined threshold, the control unit 15 detects that the transmission line 1 recovers from the failure.

In step S23, the control unit 15 controls the optical switches 12a and 12b so that the optical switches 12a and 12b are connected to different transmission lines. In this Embodiment, the control unit 15 switches connection of one of the optical switches 12a and 12b.

For example, in the switching processing in step S13, when the optical switch 12a is controlled by the control unit 15 so that the optical switch 12a connects to the transmission line 2, the control unit 15 controls the optical switch 12a so that the optical switch 12a connects to the transmission line 1. With this operation, the optical switch 12a connects to the transmission line 1 via the optical demultiplexer 11a, and the optical switch 12b holds connection with the transmission line 2 via the optical demultiplexer 11b.

In step S23, the control unit 15 may control the optical switches 12a and 12b so that the optical switch 12a holds its connection state and the optical switch 12b connects to the transmission line 1, instead of switching the connection of the optical switch 12a. In this case, the optical switch 12a holds connection with the transmission line 2 via the optical demultiplexer 11b, and the optical switch 12b connects to the transmission line 1 via the optical demultiplexer 11a.

No signal light is output from the optical switch, the switching processing of which is in progress in step S23, during the switching processing (step S24). In this Embodiment, since the optical switch 12a performs the switching processing in step S23, a loss of signal of the signal light component SGb occurs in the optical transmission line switching apparatus 14a while the optical switch 12a performs the switching processing. Communication in the optical transmission system 100 after step S24 is the same as in steps S15 to S19 in FIG. 4.

The effects of the optical transmission system 100 according to Embodiment 1 will be described.

Figure 7:
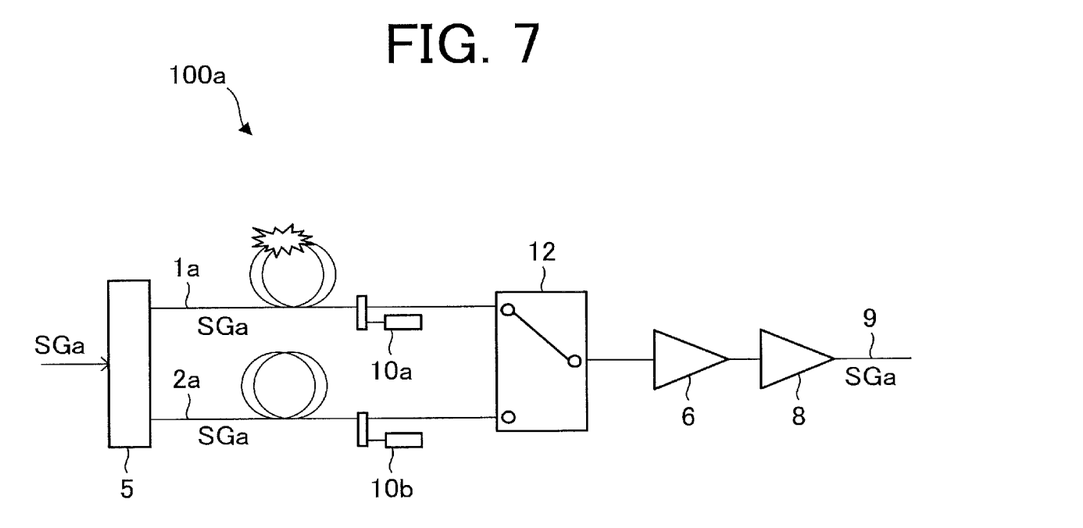
FIG. 7 is a diagram schematically illustrating a configuration of an optical transmission system according to a Comparative Example.

FIG. 7 is a diagram schematically illustrating a configuration of an optical transmission system 100a according to a Comparative Example.

Figure 8:
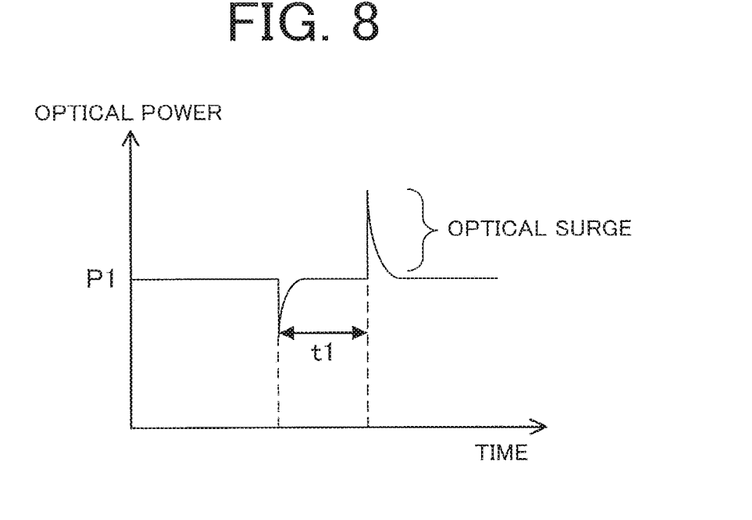
FIG. 8 is a diagram illustrating the optical power of signal light passing through a transmission line in the optical transmission system according to the Comparative Example.

FIG. 8 is a diagram illustrating the optical power of signal light SGa passing through a transmission line 9 in the optical transmission system 100a.

The optical transmission system 100a illustrated in FIG. 7 serves as a redundant optical transmission system. More specifically, the optical transmission system 100a includes an optical splitter 5, a transmission line 1a as an active line, a transmission line 2a as a standby line, an optical power measuring unit 10a to measure the optical power of a signal light beam SGa passing through the transmission line 1a, an optical power measuring unit 10b to measure the optical power of a signal light beam SGa passing through the transmission line 2a, an optical switch 12 to perform connection switching to establish connection with one of the transmission lines 1a and 2a, and optical amplifiers 6 and 8. The optical transmission system 100a includes no optical demultiplexers 11a and 11b, and uses only one optical switch.

In the optical transmission system 100a, when a failure occurs in the transmission line 1a, the optical switch 12 switches connection from the transmission line 1a to the transmission line 2a. The optical amplifiers 6 and 8 perform constant output control to amplify the optical power of the signal light SGa to P1, but during switching in the optical switch 12, a loss of signal occurs, and the signal light SGa is not input to the optical amplifiers 6 and 8. In this case, when a failure occurs in the transmission line 1a, since the optical power drops, the optical amplifiers 6 and 8 raise their amplification gain. After the elapse of a time t1, the switching in the optical switch 12 is completed, and the optical switch 12 connects to the transmission line 2a. With this operation, the signal light beam SGa passing through the transmission line 2a is amplified by the optical amplifiers 6 and 8. However, since the amplification gain is excessive, an optical surge occurs, as illustrated in FIG. 8. When an optical surge occurs, it may damage the optical amplifiers and an optical receiver on the downstream side in the optical transmission system 100a.

In contrast, in the optical transmission system 100 according to this Embodiment, the optical transmission line switching apparatus 14a includes the optical demultiplexer 11a, the optical demultiplexer 11b, the optical switch 12a, the optical switch 12b, and the control unit 15. When a failure occurs in one of the at least two transmission lines, the control unit 15 controls the optical switches 12a and 12b so that the optical switches 12a and 12b are connected to a transmission line that does not have the failure.

In this Embodiment, while the optical switch 12a performs the switching processing (that is, during the time t1), since at least the signal light component SGc passes through the optical transmission line switching apparatus 14a, a complete loss of signal in the optical transmission line switching apparatus 14a can be prevented. While the optical switch 12a performs the switching processing, since at least the signal light component SGc is input to the optical amplifiers 6 and 8, the optical amplifiers 6 and 8 raise their amplification gain for the signal light component SGc output from the optical transmission line switching apparatus 14a, and after the elapse of the time t1, lower their amplification gain for the signal light component SGc contained in the signal light SGa output from the optical transmission line switching apparatus 14a. With this operation, before and after the occurrence of a failure, the optical power of the signal light SGa passing through the transmission line 9 is maintained constant, and any optical surge can thus be prevented when the transmission line is switched.

When recovery from the failure is completed, the control unit 15 controls the optical switches 12a and 12b so that the optical switches 12a and 12b are connected to different transmission lines. During the switching processing, no signal light is output from the optical switch in which the switching processing is being performed. Therefore, a temporary loss of signal problematically occurs in the optical transmission line switching apparatus 14a. However, when the recovery from the failure is completed, if the switching processing is not performed, only the signal light beam SGa passing through one transmission line (in this Embodiment, the transmission line 2) passes through the optical switch. In this case, when a failure occurs in the transmission line 2, a complete loss of signal occurs in the optical transmission line switching apparatus 14a, and thus causes an optical surge, as in the optical transmission system 100a according to the Comparative Example.

When recovery from the failure is completed, therefore, the control unit 15 controls the optical switches 12a and 12b so that the optical switches 12a and 12b are connected to different transmission lines, and thus it is possible to achieve redundant transmission lines in the optical transmission system 100 and to prevent occurrence of an optical surge when a failure occurs in the main transmission line 4b.

Furthermore, when recovery from the failure is completed, performing the switching processing causes a loss of signal of the signal light component SGb in the optical transmission line switching apparatus 14a, and the optical receiver (in this Embodiment, the optical receiver 27a) detects the loss of signal. Since the optical receiver 27a or 27b detects the loss of signal and thus starts optimum adjustment to receive signal light again, transmission of the signal light SGa in the optical transmission system 100 can be restarted quickly.

In the optical transmission line switching apparatus 14a, the signal light SGa is separated into signal light components SGb and SGc by each of the optical demultiplexers 11a and 11b. However, in the optical transmission line switching apparatus 14a, the signal light SGa may be separated into dummy light components or noise light components. Even in this case, the same effects as the above-mentioned effects can be obtained. For example, a complete loss of signal in the optical transmission system 100 can be prevented by using dummy light as light to be transmitted through a transmission line in which a failure frequently occurs. Furthermore, the optical transmission system 100 may be configured to allow high-priority signal light to pass through a transmission line in which a failure not frequently occurs.

Embodiment 2

Figure 9:
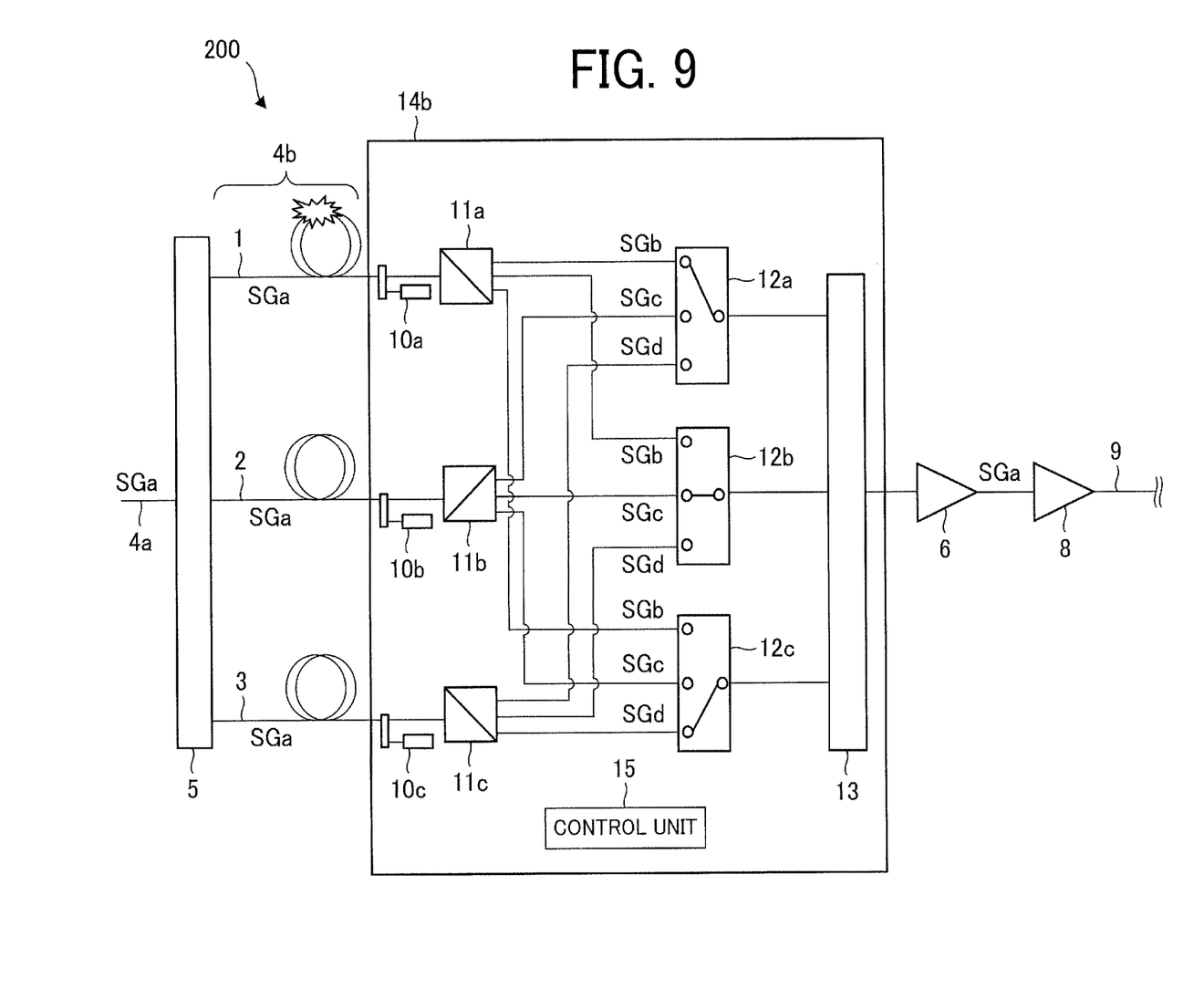
FIG. 9 is a diagram schematically illustrating a configuration of an optical transmission system according to Embodiment 2 of the present invention.

FIG. 9 is a diagram schematically illustrating a configuration of an optical transmission system 200 according to Embodiment 2 of the present invention.

In an optical transmission line switching apparatus 14b of the optical transmission system 200 according to Embodiment 2, a main transmission line 4b includes three transmission lines 1, 2, and 3. The optical transmission system 200 further includes an optical power measuring unit 10c in addition to optical power measuring units 10a and 10b, an optical demultiplexer 11c in addition to optical demultiplexers 11a and 11b, and an optical switch 12c in addition to optical switches 12a and 12b.

Each optical demultiplexer separates signal light SGa into three types of signal light components (more specifically, a signal light component SGb having a first wavelength, a signal light component SGc having a second wavelength, and a signal light component SGd having a third wavelength). Hence, the optical power input to each optical switch is lower than that input to each optical switch of the optical transmission system 100 according to Embodiment 1.

Figure 10A:
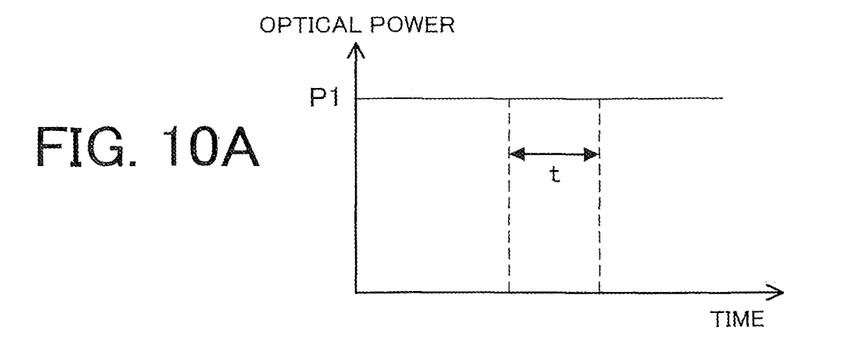
FIGS. 10A to 10C are diagrams each illustrating the optical power of signal light passing through a transmission line.
Figure 10B:
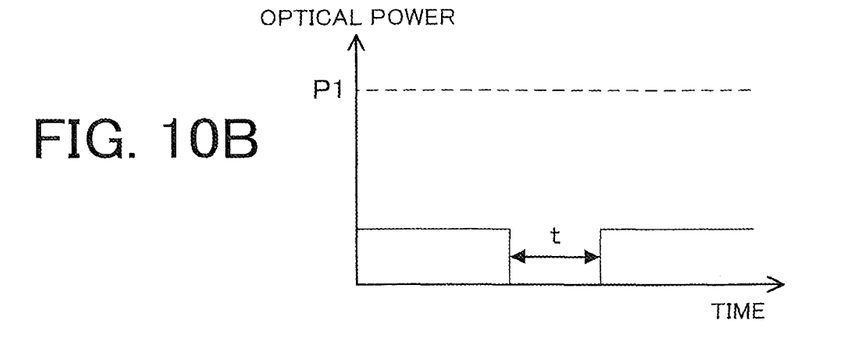
Figure 10C:
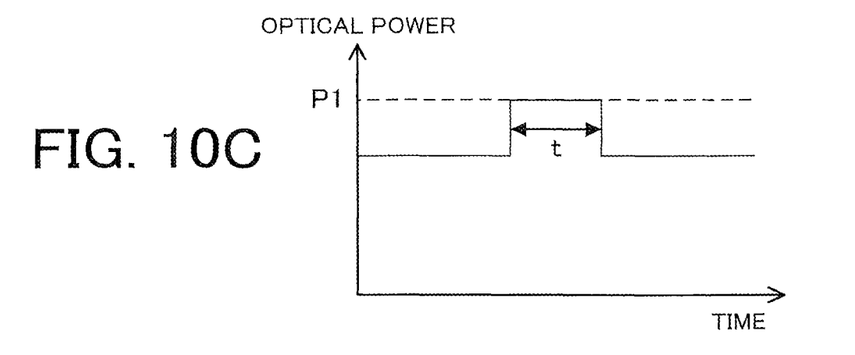

FIG. 10A is a diagram illustrating the optical power of the signal light SGa passing through a transmission line 9, FIG. 10B is a diagram illustrating the optical power of the signal light component SGb of the optical power of the signal light SGa passing through the transmission line 9, and FIG. 10C is a diagram illustrating the optical power of each of the signal light components SGc and SGd of the optical power of the signal light SGa passing through the transmission line 9. As illustrated in FIG. 10C, the change in optical power of each of the signal light components SGc and SGd in the optical transmission system 200 is smaller than the change (FIG. 5C) in optical power of the signal light component SGc in the optical transmission system 100 according to Embodiment 1. In other words, increasing the number of transmission lines in the main transmission line 4b makes it possible to reduce the change in optical power of signal light (in this Embodiment, the signal light components SGc and SGd) that does not have a loss of signal, and to reduce signal light beams that have the loss of signal. As a result, the reliability of the optical transmission system 200 can be improved.

The optical transmission system 200 according to Embodiment 2 has the same effects as the optical transmission system 100 according to Embodiment 1. In addition, in the optical transmission system 200, three transmission lines (that is, the transmission lines 1, 2, and 3) achieve a redundant system. Therefore, even when a failure occurs in one transmission line, communication can be performed by using the other two transmission lines. This makes it possible to achieve communication more reliable than in the optical transmission system 100 according to Embodiment 1.

Embodiment 3

Figure 11:
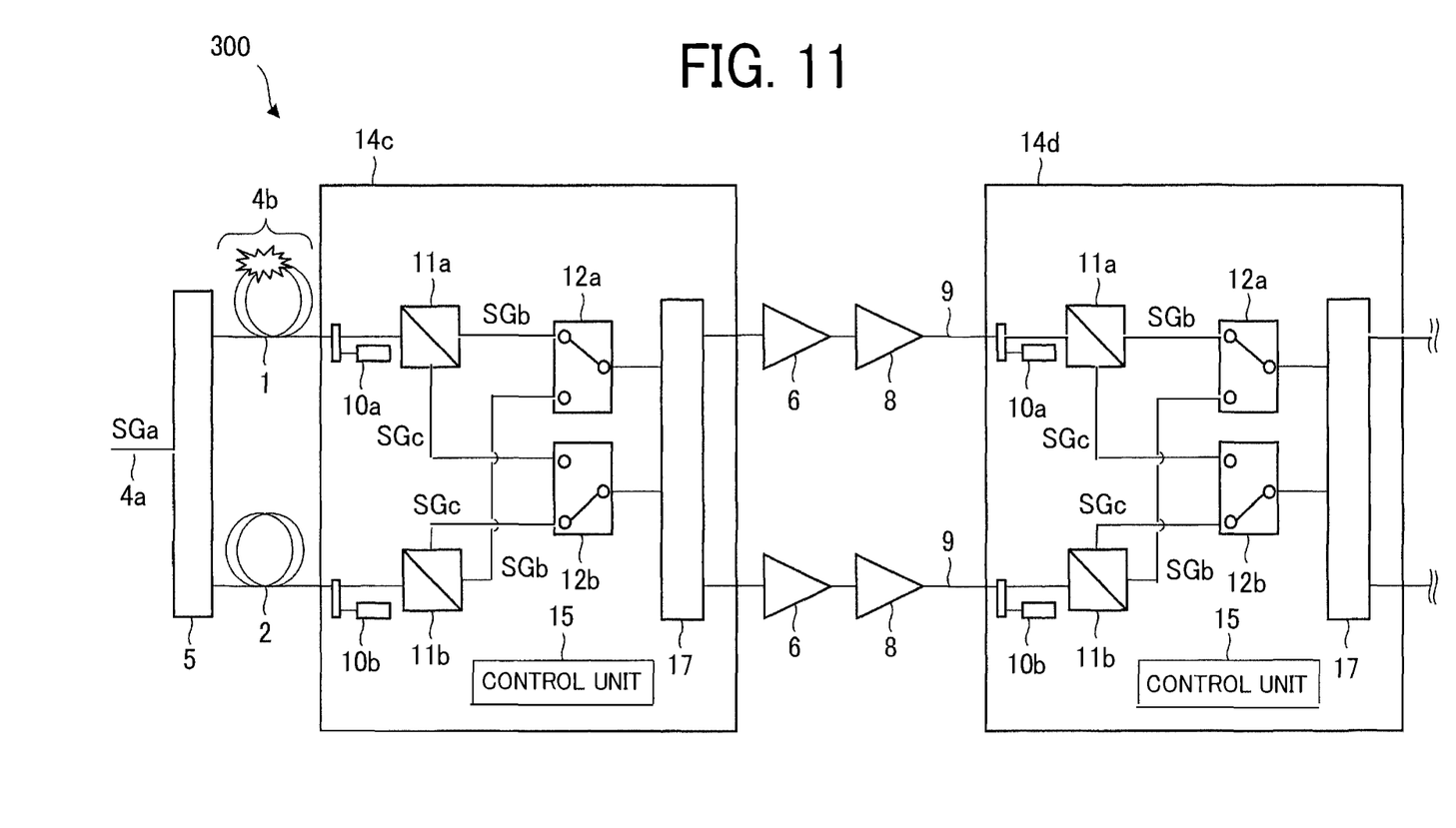
FIG. 11 is a diagram schematically illustrating a configuration of an optical transmission system according to Embodiment 3 of the present invention.

FIG. 11 is a diagram schematically illustrating a configuration of an optical transmission system 300 according to Embodiment 3 of the present invention.

The optical transmission system 300 includes two optical transmission line switching apparatuses (more specifically, optical transmission line switching apparatuses 14c and 14d) connected in cascade. The operations of the optical transmission line switching apparatuses 14c and 14d are the same as that of the optical transmission line switching apparatus 14a of the optical transmission system 100 according to Embodiment 1. However, each of the optical transmission line switching apparatuses 14c and 14d uses an optical combining and splitting device 17 that can multiplex and demultiplex signal light in place of the multiplexer 13. The optical combining and splitting device 17 multiplexes signal light components SGb and SGc and distributes multiplexed signal light SGa to two transmission lines 9.

The optical transmission system 300 according to Embodiment 3 has the same effects as the optical transmission system 100 according to Embodiment 1. In addition, in the optical transmission system 300, even when a failure occurs in a transmission line (for example, one of the two transmission lines 9) between the optical transmission line switching apparatus 14c and the optical transmission line switching apparatus 14d, transmission of the multiplexed signal light SGa can be maintained. Therefore, the optical transmission system 300 can achieve highly reliable communication.

The features in the above-described embodiments can be combined together as appropriate.

DESCRIPTION OF REFERENCE CHARACTERS

1, 2, 3, 9, 41a, 41b, 42a, 42b, 43a, 43b transmission line; 4a, 4b, main transmission line; 5 optical splitter; 6, 8 optical amplifier; 10a, 10b, 10c optical power measuring unit; 11a, 11b, 11c optical demultiplexer (demultiplexer); 12a, 12b, 12c optical switch (optical transmission line switching unit); 13 multiplexer; 14a, 14b, 14c, 14d optical transmission line switching apparatus; 15 control unit; 27a, 27b optical receiver; 100, 100a, 200, 300 optical transmission system.

What is claimed is:

1. An optical transmission line switching apparatus to relay main signal light input via a main transmission line including at least two transmission lines, the apparatus comprising:
 a first demultiplexer to separate, into a plurality of signal light components, the main signal light input via a first transmission line of the at least two transmission lines;
 a second demultiplexer to separate, into the plurality of signal light components, the main signal light input via a second transmission line of the at least two transmission lines;
 a first optical transmission line switching device to perform connection switching to establish connection with one of the at least two transmission lines;
 a second optical transmission line switching device to perform connection switching to establish connection with one of the at least two transmission lines; and
 a controller to control the first optical transmission line switching device and the second optical transmission line switching device,
 wherein when no failure occurs in the at least two transmission lines, the controller controls the first optical transmission line switching device and the second optical transmission line switching device so that the first optical transmission line switching device and the second optical transmission line switching device are connected to different transmission lines of the at least two transmission lines,
 when a failure occurs in one of the at least two transmission lines, the controller controls the first optical transmission line switching device and the second optical transmission line switching device so that the first optical transmission line switching device and the second optical transmission line switching device are connected to a transmission line that does not have the failure of the at least two transmission lines, and
 when recovery from the failure is completed, the controller controls the first optical transmission line switching device and the second optical transmission line switching device so that the first optical transmission line switching device and the second optical transmission line switching device are connected to different transmission lines of the at least two transmission lines.

2. The optical transmission line switching apparatus according to claim 1, further comprising a first optical power measuring device to measure optical power of the main signal light passing through a first transmission line of the at least two transmission lines, and send a measurement result to the controller, wherein the controller controls the first optical transmission line switching device and the second optical transmission line switching device, based on the measurement result of the optical power of the main signal light passing through the first transmission line.

3. The optical transmission line switching apparatus according to claim 2, wherein when the measurement result of the optical power of the main signal light passing through the first transmission line is lower than a predetermined threshold, the controller detects that the failure occurs in the first transmission line.

4. The optical transmission line switching apparatus according to claim 3, wherein when the controller detects that the failure occurs in the first transmission line, the controller controls the first optical transmission line switching device and the second optical transmission line switching device so that the first optical transmission line switching device and the second optical transmission line switching device are connected to a transmission line other than the first transmission line.

5. The optical transmission line switching apparatus according to claim 4, wherein after occurrence of the failure, when the measurement result of the optical power of the main signal light passing through the first transmission line is not less than a predetermined threshold, the controller detects that the first transmission line recovers from the failure.

6. The optical transmission line switching apparatus according to claim 1, further comprising a second optical power measuring device to measure optical power of the main signal light passing through a second transmission line of the at least two transmission lines, and send a measurement result to the controller, wherein the controller controls the first optical transmission line switching device and the second optical transmission line switching device, based on the measurement result of the optical power of the main signal light passing through the second transmission line.

7. The optical transmission line switching apparatus according to claim 6, wherein when the measurement result of the optical power of the main signal light passing through the second transmission line is lower than a predetermined threshold, the controller detects that the failure occurs in the second transmission line.

8. The optical transmission line switching apparatus according to claim 7, wherein when the controller detects that the failure occurs in the second transmission line, the controller controls the first optical transmission line switching device and the second optical transmission line switching device so that the first optical transmission line switching device and the second optical transmission line switching device are connected to a transmission line other than the second transmission line.

9. The optical transmission line switching apparatus according to claim 8, wherein after occurrence of the failure, when the measurement result of the optical power of the main signal light passing through the second transmission line is not less than a predetermined threshold, the controller detects that the second transmission line recovers from the failure.

10. An optical transmission system comprising:
a main transmission line including at least two transmission lines;
an optical transmission line switching apparatus connected to the main transmission line; and
an optical receiver to receive main signal light transferred from the optical transmission line switching apparatus, the optical transmission line switching apparatus comprising:
a first demultiplexer to separate; into a plurality of signal light components; the main signal light input via a first transmission line of the at least two transmission lines;
a second demultiplexer to separate, into the plurality of signal light components, the main signal light input via a second transmission line of the at least two transmission lines;
a first optical transmission line switching device to perform connection switching to establish connection with one of the at least two transmission lines;
a second optical transmission line switching device to perform connection switching to establish connection with one of the at least two transmission lines; and
a controller to control the first optical transmission line switching device and the second optical transmission line switching device,
wherein when no failure occurs in the at least two transmission lines, the controller controls the first optical transmission line switching device and the second optical transmission line switching device so that the first optical transmission line switching device and the second optical transmission line switching device are connected to different transmission lines of the at least two transmission lines,
when a failure occurs in one of the at least two transmission lines, the controller controls the first optical transmission switching device and the second optical transmission line switching device so that the first optical transmission line switching device and the second optical transmission line switching device are connected to a transmission line that does not have the failure of the at least two transmission lines, and
when recovery from the failure is completed, the controller controls the first optical transmission line switching device and the second optical transmission line switching device so that the first optical transmission line switching device and the second optical transmission line switching device are connected to different transmission lines of the at least two transmission lines.

11. The optical transmission system according to claim 10, wherein when the recovery from the failure is completed, the optical receiver detects a temporary loss of signal of the signal light from the optical transmission line switching apparatus and thus starts optimum adjustment to receive the signal light again.

12. A transmission line switching method for an optical transmission line switching apparatus including a first optical transmission line switching device to perform connection switching to establish connection with one of at least two transmission lines, and a second optical transmission line switching device to perform connection switching to establish connection with one of the at least two transmission lines, the method comprising:
when no failure occurs in the at least two transmission lines, controlling the first optical transmission line switching device and the second optical transmission line switching device so that the first optical transmission line switching device and the second optical transmission line switching device are connected to different transmission lines of the at least two transmission lines;

when a failure occurs in one of the at least two transmission lines, controlling the first optical transmission line switching device and the second optical transmission line switching device so that the first optical transmission line switching device and the second optical transmission line switching device are connected to a transmission line that does not have the failure of the at least two transmission lines; and when recovery from the failure is completed, controlling the first optical transmission line switching device and the second optical transmission line switching device so that the first optical transmission line switching device and the second optical transmission line switching device are connected to different transmission lines of the at least two transmission lines.

* * * * *